April 26, 1927.
O. E. COOK
1,626,515
TEMPERATURE CONTROL FOR FOLDING MACHINES, ETC
Filed Nov. 14, 1925
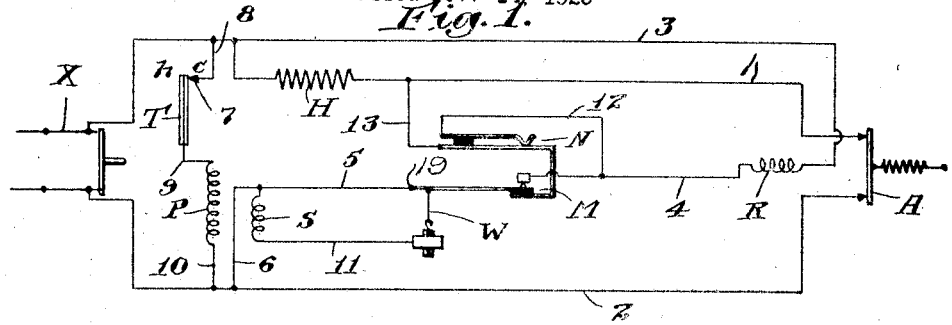
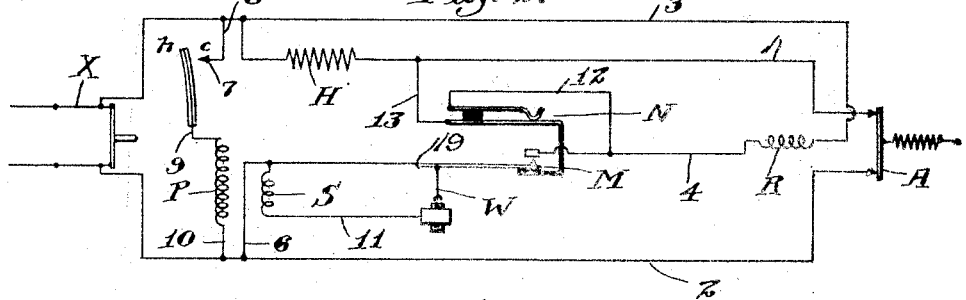
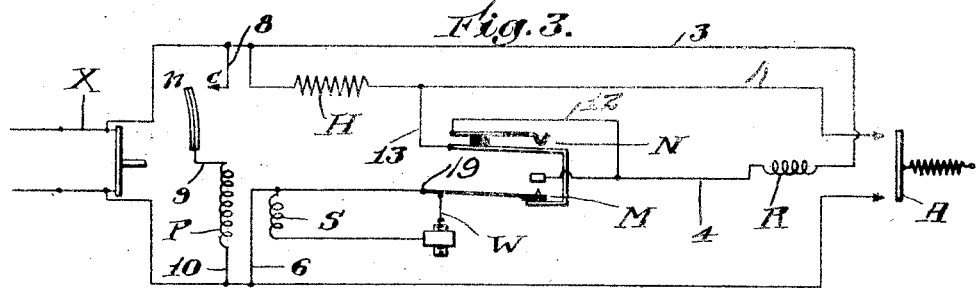
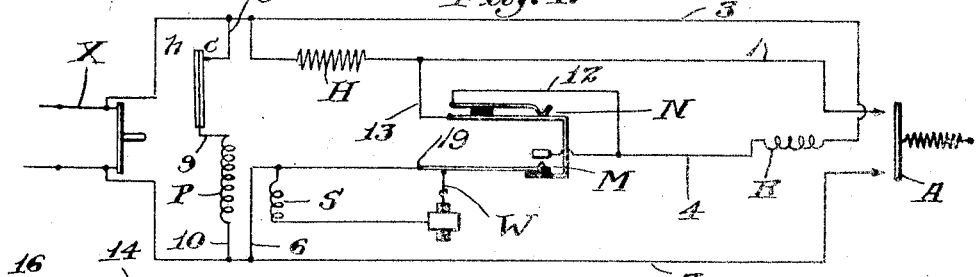
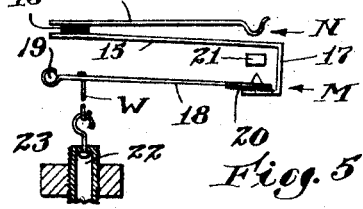
Inventor
Orville E. Cook
by Roberts Roberts & Cushman
his Attorneys Patented Apr. 26, 1927.

1,626,515

UNITED STATES PATENT OFFICE.

ORVILLE E. COOK, OF TROY, NEW YORK, ASSIGNOR TO CLUETT, PEABODY & CO., INC., OF TROY, NEW YORK, A CORPORATION OF NEW YORK.

TEMPERATURE CONTROL FOR FOLDING MACHINES, ETC.

Application filed November 14, 1925. Serial No. 69,002.

In many thermostatically controlled devices and appliances trouble results from momentary opening or closing of the thermostat when the temperature is near the upper and lower limits of the thermostat. For example, in a folding machine for folding and pressing collar blanks in the manufacture of collars which has a thermostat in the heated bed for regulating the temperature of the bed, vibration of the machine causes this momentary opening and closing, thereby causing the heating circuit to be opened and closed so often that the contact points are soon destroyed by arcing.

Objects of the present invention are to avoid the unnecessary actuation of the circuit closer (or other thermostatically controlled device) due to momentary opening or closing of the thermostat as a result of jar or other cause when the thermostat is at a temperature near its opening or closing temperature, and to provide means to this end which are simple and reliable in operation.

The genus of the invention is set forth in the accompanying claims and illustrated by one concrete embodiment in the accompanying drawings in which—

Fig. 1 is a diagram showing the parts in normal operative positions;

Fig. 2 is a diagram showing the parts in the positions resulting from momentary opening of the thermostat;

Fig. 3 is a diagram showing the parts in open or inoperative positions;

Fig. 4 is a diagram showing the parts in the positions which they occupy when the thermostat closes momentarily; and Fig. 5 is a side view of one form of slow-acting heat-controlled switch applicable to the present invention.

In the particular embodiment illustrated in the figures, H represents a heating element which may for example be the resistance heater in the bed plate of a folding machine; 1—2 the main circuit for the heater which may be connected to a suitable source of current through switch X; A a circuit closer for the heater circuit which is opened by a spring and closed by the magnet R in the energizing circuit 3—4—5—6; M a switch in the energizing circuit; T a thermostat associated with the heater H, the thermostat having a cold position $c$ in which it engages a contact 7 and a hot position $h$ in which it is separated from the contact 7, P the primary of a transformer in series with the thermostat T in a circuit 8—9—10 which is in parallel with the heater circuit 1—2, and S the secondary of the transformer which is connected in series with a heat-responsive element W in the circuit 5—11. In parallel with the switch M is a locking circuit comprising conductors 12 and 13 and switch N.

The two switches M and N are interconnected as illustrated in Fig. 5. The switch N comprises a flexible leaf contact member 14 fixedly mounted on a suitable support, and insulated from the flexible contact element 15 by insulation 16. The element 15 may be formed of phosphorus bronze and has a depending arm 17 hooking under the element 18 of switch M. Element 18 is preferably rigid and pivotally mounted on a suitable support at 19. The arm 18 is insulated from the arm 17 by insulation 20 riveted to arm 18. A stationary contact 21 is fixedly mounted in the path of arm 18 so that the circuit is closed between 18 and 21 when the arm 18 is swung in a counterclockwise direction about the pivot 19.

In the particular embodiment illustrated in the drawings the switches M and N are actuated by a wire W which is formed of some material such as nichrome resistance wire having a relatively high coefficient of expansion. This wire is attached to the arm 18 at its upper end and at its lower end to an adjusting screw 22 which threads up and down in a fixed support 23. The wire W is so adjusted by means of screw 22 that both switches are held in open position when the wire is cold and so that the switches may both close when the wire is heated by current derived from the transformer secondary S through the circuit 5—11. The spring element 15 is resilient and so mounted that it not only tends to spring into engagement with contact 14 but is strong enough to lift arm 18 into contact with 21 when the wire is heated.

When the thermostat T is closed (Fig. 1) heating current flows through the circuit H—1—A—2; current also flows through 8—7—T—9—P—10 to induce current in circuit S—5—W—11 thereby heating wire W sufficiently to permit the switches M and N to close; energizing current is supplied to magnet R through the circuit 3—R—4—

M—5—6; and the magnet R is locked independently of switch M by the circuit 3—R—4—12—N—13—1—A—2.

When the thermostat T is opened momentarily, (Fig. 2) thereby momentarily stopping the heating current in W, the wire W starts to contract, first opening switches M. However this does not de-energize magnet R inasmuch as it is locked by the aforesaid locking circuit; only prolonged opening of the thermostat will cause the switch M to open. After the thermostat T has been open for some time the wire W contracts sufficiently to open the switch N, thereby de-energizing magnet R which permits armature A to open the heating circuit. The parts are then in the position shown in Fig. 3.

It will of course be understood that the action of the thermostat lags somewhat behind the heating and cooling of the heater, owing to the time required for transmission of heat from the heater to the thermostat. Consequently the thermostat continues to move away from the contact 7 for a time after the circuit 8—9—10 is broken, the slow action of the wire W also contributing to this continued opening of the thermostat. However after the heating circuit has been open for a period the thermostat starts to close and as it approaches the contact 7 it may make momentary contact several times before it presses against the contact with sufficient force to remain closed. Each of these momentary contacts causes the wire W to be momentarily heated but by properly predetermining the spaces between the contacts of the two switches, the space between the contacts of switch N being less than the space between the contacts of switch M, and also by adjustment of the amount of heating current flowing through wire W and the rate of expansion of the wire W, this momentary closing does not cause the wire W to expand sufficiently to close the switch M. While the switch N may be closed by this momentary closing of the thermostat the switch N does not energize magnet R but only serves to maintain the magnet energized after its circuit is first closed by switch M.

In applying this invention to folding machines the temperature of the bed plate of the folding machine may be maintained within a narrow range by an ordinary thermostat which may chatter considerably when it is about to open or close. For example the temperature may be readily maintained between the limits of 440° and 460° in which case the parts may be adjusted so that the thermostat may start to open at approximately 457° and start to close at approximately 443°, it being understood that the aforesaid lag will result in the temperature of the bed plate rising a few degrees after the thermostat has opened and continuing to fall a few degrees even after the thermostat is again closed. Thus this invention greatly reduces the number of times the heating circuit is opened and closed by the magnet R thereby greatly prolonging the life of the contacts of the armature A.

I claim:

1. Apparatus for controlling an electric heater comprising a circuit closer for connection in circuit with the heater, a magnet for actuating said circuit closer, a thermostat responsive to said heater for controlling the closer, and means for preventing momentary opening and closing of said thermostat from affecting said magnet.

2. Apparatus for controlling an electric heater comprising a circuit closer for connection in circuit with the heater, a magnet for actuating said circuit closer, a thermostat responsive to said heater, a switch for controlling the circuit of said closer, and means irresponsive to momentary opening or closing of the thermostat but responsive to prolonged opening or closing of the thermostat for actuating said switch.

3. Apparatus for controlling an electric heater comprising a circuit closer for connection in circuit with the heater, a magnet for actuating said circuit closer, a thermostat responsive to said heater, a circuit controlled by said thermostat for energizing the magnet, a locking circuit for the magnet, and slow-acting means irresponsive to momentary opening of the thermostat but responsive to prolonged opening of the thermostat for opening said locking circuit.

4. Apparatus for controlling an electric heater comprising a circuit closer for connection in circuit with the heater, a magnet for actuating said circuit closer, a thermostat responsive to said heater, a circuit controlled by said thermostat for energizing the magnet, a locking circuit for the magnet, and slow-acting means responsive to the thermostat for first closing the locking circuit and later closing the energizing circuit.

5. Apparatus for controlling a heater of the type which generates heat when a circuit is closed comprising a circuit closer in said circuit, a magnet for actuating said circuit closer, a thermostat responsive to said heater, a circuit controlled by said thermostat for energizing the magnet, a locking circuit for the magnet, a switch in each of said energizing and locking circuits, and means responsive to the thermostat for actuating the two switches in sequence, the locking switch being closed and opened respectively in response to momentary closing and prolonged opening of the thermostat and the energizing switch being closed and opened respectively in response to prolonged closing and momentary opening of the thermostat, whereby the heater circuit is unaffected by momentary closing or opening of the thermostat.

6. Apparatus for controlling an electric heater comprising a circuit closer in circuit with the heater, slow-acting temperature-controlled means for controlling the circuit closer, and a thermostat responsive to the heater for controlling said means.

7. Apparatus for controlling a heater comprising a control circuit a circuit closer in said circuit, slow-acting temperature-controlled means for controlling the circuit closer, and a branch circuit containing a thermostat responsive to said heater, and means for supplying heat to said slow-acting means when the thermostat is closed.

8. Apparatus for controlling a heater comprising a control circuit a circuit closer in said circuit, a magnet for actuating said circuit, a thermostat responsive to said heater for controlling the closer, and means controlled by the thermostat for controlling the magnet, said means being irresponsive to momentary opening and closing of the thermostat.

9. Apparatus for controlling a heater comprising a control circuit a circuit closer in said circuit, a thermostat responsive to said heater, and a delayed-action switch irresponsive to momentary opening and closing of the thermostat but responsive to prolonged opening or closing of said thermostat for controlling said closer.

10. Apparatus for controlling a heater comprising a control circuit a circuit closer in said circuit, a thermostat responsive to said heater for controlling the closer, a switch interposed in said circuit for preventing momentary opening and closing of said thermostat from affecting the magnet, and means responsive to prolonged opening or closing of the thermostat for controlling said switch.

11. Apparatus for controlling a heater comprising a control circuit a circuit closer in said circuit, a magnet for actuating said circuit closer, a thermostat responsive to said heater for controlling the closer, a locking circuit comprising a movable arm interposed in said circuit for preventing momentary opening and closing of the thermostat from affecting the magnet, and means responsive to prolonged closing of the thermostat for controlling the movable arm.

12. Apparatus for controlling a heater comprising a control circuit a circuit closer in said circuit, a magnet for actuating the closer, an energizing circuit in parallel with the heater control circuit and containing said magnet, an energizing switch in said energizing circuit, a locking circuit in parallel with said switch and with said heater control circuit, a locking switch in said locking circuit, a thermostat responsive to said heater, and slow-acting means controlled by said thermostat for actuating said switches in sequence, the locking switch being closed only in response to prolonged closing of the thermostat.

13. Apparatus for controlling an electric heater comprising a control circuit including said heater a circuit closer in said circuit, a magnet for actuating the closer, an energizing circuit in parallel with the heater and containing said magnet, an energizing switch in said energizing circuit, a locking circuit in parallel with said switch and with said heater, a locking switch in said locking circuit, a thermostat responsive to said heater, and slow-acting heat-responsive means controlled by said thermostat for actuating said switches in sequence, the locking switch being opened only in response to prolonged opening of the thermostat.

Signed by me at Troy, New York, this 11 day of November, 1925.

ORVILLE E. COOK.